US006611583B1

(12) United States Patent
Gainsboro

(10) Patent No.: US 6,611,583 B1
(45) Date of Patent: Aug. 26, 2003

(54) COMPUTER-BASED METHOD AND APPARATUS FOR CONTROLLING, MONITORING, RECORDING AND REPORTING TELEPHONE ACCESS

(75) Inventor: Jay L. Gainsboro, Framingham, MA (US)

(73) Assignee: T-Netix, Inc., Carrollton, TX (US)

( * ) Notice: Subject to any disclaimer, the term of this patent is extended or adjusted under 35 U.S.C. 154(b) by 0 days.

(21) Appl. No.: 09/222,130

(22) Filed: Dec. 29, 1998

Related U.S. Application Data

(63) Continuation of application No. 08/726,217, filed on Oct. 4, 1996, now Pat. No. 5,926,533, which is a continuation-in-part of application No. 08/510,327, filed on Aug. 2, 1995, now Pat. No. 5,655,013, which is a continuation of application No. 08/229,517, filed on Apr. 19, 1994, now abandoned.

(51) Int. Cl.$^7$ ................................................ H04M 3/00
(52) U.S. Cl. ........................ 379/188; 379/199; 379/249
(58) Field of Search .............................. 379/34, 35, 114, 379/188, 189, 190, 194, 195, 196–200, 386, 88.22, 207.01, 207.02, 207.11, 211.01, 211.02, 201.01, 207.1, 380, 202.01, 93.01, 93.21, 114.01

(56) References Cited

U.S. PATENT DOCUMENTS

| | | | |
|---|---|---|---|
| 3,851,121 A | | 11/1974 | Marvin |
| 4,001,513 A | * | 1/1977 | Naylor ........................ 379/115 |
| 4,002,848 A | * | 1/1977 | Stein ........................... 379/119 |
| 4,054,756 A | | 10/1977 | Comella et al. |

(List continued on next page.)

FOREIGN PATENT DOCUMENTS

JP 5-30193 5/1993 ................. 379/249

OTHER PUBLICATIONS

LazerVoice, Digital Recording System Inmate Services, 1997–98 Schlumberger Technologies, Inc./LazerVoice, STIL V0222 LazerVoice User's Manual—Version 2.22.
LazerPhone User Reference Manual.
LazerPhone, Inmate Telephone System, Users Manual, 1998 Schlumberger Technologies, Inc./Global Tel*Link, Lazer-Phone User's Manual—Version 1.0.
LazerPhone, Powerful Performance Uncompromising Standards, 1998.
LazerPhone Technical Manual, System Overview.
Bahl, L. "Maximum Likeihood Approach to Continous Speech Recovery", Readings in Speech Recognition Ed. A. Waibel and K. Lee, Morgan Kaufmann Publishers, pp 308–319, IEEE 1983.
Batten, A. "Personal Communications Service and the Intelligent Network", Britsh Telecommunications Engineering, vol. 9, pp 88–91 Aug. 1990.

(List continued on next page.)

Primary Examiner—Fan Tsang
Assistant Examiner—Roland G. Foster
(74) Attorney, Agent, or Firm—Fenwick & West LLP

(57) ABSTRACT

A telephone station interface is provided with apparatus for detecting when a called party has or is attempting to patch or bridge one telephone call with another telephone call. The detecting of such bridging or conferencing is accomplished through the detection of tones which are commonly associated with such activities, such as a ring signal, a busy signal, special information tones (SIT tones), dual tone multi-frequency (DTMF) tones or so-called Touch Tones, call progress tones, or other tones that occur when calls are placed. The present invention does not have the capability of sensing clicks, pops, or other audio signals associated with the conferencing of multiple communications circuits. The method and apparatus herein are for managing institutional telephone activity, and utilize a computer control unit to control a trunk management unit, which connects institutional telephones to outside telephone lines.

27 Claims, 6 Drawing Sheets

U.S. PATENT DOCUMENTS

| | | | |
|---|---|---|---|
| 4,188,508 A | * | 2/1980 | Rogers et al. ............... 379/189 |
| 4,310,726 A | * | 1/1982 | Asmuth ....................... 379/297 |
| 4,405,833 A | | 9/1983 | Cave et al. |
| 4,518,825 A | | 5/1985 | Brikerhoff et al. |
| 4,559,416 A | | 12/1985 | Theis et al. |
| 4,602,129 A | | 7/1986 | Matthews et al. |
| 4,696,031 A | | 9/1987 | Freudberg et al. |
| 4,726,057 A | | 2/1988 | Doerry et al. |
| 4,782,516 A | | 11/1988 | Maybach et al. |
| 4,794,642 A | | 12/1988 | Arbabzadah et al. |
| 4,799,255 A | | 1/1989 | Billinger et al. |
| 4,815,120 A | | 3/1989 | Kosich et al. |
| 4,885,765 A | * | 12/1989 | Shirakawa ............... 379/93.23 |
| 4,896,348 A | | 1/1990 | Grantland et al. |
| 4,899,375 A | | 2/1990 | Bauer et al. |
| 4,901,341 A | | 2/1990 | Carter et al. |
| 4,922,519 A | | 5/1990 | Daudelin |
| 4,922,520 A | | 5/1990 | Bernard et al. |
| 4,924,488 A | | 5/1990 | Kosich |
| 4,933,966 A | * | 6/1990 | Hird et al. ................... 379/132 |
| 4,933,967 A | | 6/1990 | Lo et al. |
| 4,935,956 A | | 6/1990 | Hellwarth et al. |
| 4,937,862 A | | 6/1990 | Kosich |
| 4,993,068 A | | 2/1991 | Poisenka et al. |
| 5,023,869 A | | 6/1991 | Grover et al. |
| 5,023,906 A | * | 6/1991 | Novas ......................... 379/372 |
| 5,033,088 A | | 7/1991 | Shipman |
| 5,054,059 A | | 10/1991 | Stern et al. |
| 5,063,593 A | | 11/1991 | Kwon |
| 5,109,405 A | | 4/1992 | Morganstein |
| 5,131,024 A | * | 7/1992 | Pugh et al. ............... 379/88.24 |
| 5,150,357 A | | 9/1992 | Hopner et al. |
| 5,163,083 A | * | 11/1992 | Dowden et al. ............. 379/223 |
| 5,187,740 A | * | 2/1993 | Swaim et al. ........... 379/209.01 |
| 5,200,995 A | | 4/1993 | Gaukel et al. |
| 5,210,789 A | | 5/1993 | Jeffus et al. |
| 5,222,120 A | * | 6/1993 | McLeod et al. ......... 379/88.24 |
| 5,229,764 A | | 7/1993 | Matchett et al. |
| 5,276,731 A | | 1/1994 | Arbel et al. |
| 5,305,312 A | * | 4/1994 | Fornek et al. ............... 370/264 |
| 5,309,505 A | | 5/1994 | Szlam et al. |
| 5,311,589 A | | 5/1994 | Bennett et al. |
| 5,319,702 A | * | 6/1994 | Kitchin et al. ............... 379/189 |
| 5,325,427 A | | 6/1994 | Dighe |
| 5,327,489 A | * | 7/1994 | Anderson et al. ........... 379/243 |
| 5,329,578 A | | 7/1994 | Brennan et al. |
| 5,345,595 A | | 9/1994 | Johnson et al. |
| 5,351,287 A | * | 9/1994 | Bhattacharyya et al. . 379/93.02 |
| 5,355,403 A | * | 10/1994 | Richardson et al. ... 379/114.21 |
| 5,375,161 A | * | 12/1994 | Fuller et al. ................. 455/417 |
| 5,442,696 A | | 8/1995 | Lindberg et al. |
| 5,452,347 A | * | 9/1995 | Iglehart et al. ............. 379/199 |
| 5,465,293 A | * | 11/1995 | Chiller et al. ............... 379/111 |
| 5,471,519 A | | 11/1995 | Howe et al. |
| 5,483,582 A | * | 1/1996 | Pugh et al. ............... 379/114.1 |
| 5,483,593 A | | 1/1996 | Gupta et al. |
| 5,535,261 A | | 7/1996 | Brown et al. |
| 5,539,812 A | | 7/1996 | Kitchin et al. |
| 5,566,229 A | | 10/1996 | Hou et al. |
| 5,583,934 A | * | 12/1996 | Zhou ..................... 379/399.02 |
| 5,606,604 A | | 2/1997 | Rosenblatt |
| 5,617,471 A | * | 4/1997 | Rogers et al. ......... 379/212.01 |
| 5,627,887 A | | 5/1997 | Freedman |
| 5,651,056 A | | 7/1997 | Eting et al. |
| 5,655,013 A | * | 8/1997 | Gainsboro ................... 379/188 |
| 5,722,418 A | | 3/1998 | Bro |
| 5,724,404 A | * | 3/1998 | Garcia et al. ............. 379/32.02 |
| 5,745,553 A | * | 4/1998 | Mirville et al. ........ 379/201.05 |
| 5,796,811 A | | 8/1998 | McFarlen |
| 5,799,068 A | | 8/1998 | Kikinis et al. |
| 5,805,685 A | | 9/1998 | McFarlen |
| 5,809,125 A | * | 9/1998 | Gammino ................... 379/189 |
| 5,883,945 A | | 3/1999 | Richardson et al. |
| 5,926,533 A | * | 7/1999 | Gainsboro ................... 379/188 |
| 5,943,403 A | | 8/1999 | Richardson, Jr. et al. |
| 5,960,064 A | * | 9/1999 | Foladare et al. ....... 379/211.01 |
| 6,052,454 A | | 4/2000 | Kek et al. |
| 6,072,860 A | | 6/2000 | Kek et al. |
| 6,141,406 A | | 10/2000 | Johnson |
| RE37,073 E | | 2/2001 | Hammond |
| 6,188,751 B1 | | 2/2001 | Scherer |

OTHER PUBLICATIONS

Lee, K. "Large–Vocabulary Speaker–Independent Continuous Speech Recognition Using HMM", Carnegie Mellon University Department of Electrical and Computer Engineering, CMU–CS–88–148 Apr. 1988.

System 20, Nov. 1992.

Telematic "ConQuest III Intimate Telephone System" Nov. 1992.

* cited by examiner

| DATE 11-JAN-92 | INMATE INFORMATION | FORM CODE S IMM_INFO.2 |

31
```
REGISTER #   11111101
NAME(L,F,M)  CHEN            LEE                              PHONE
LIVING UNIT  NA      MAILBOX  123445    STATUS A              ACCESS    183771450
COMMENTS                                                      CODE
SCHEDULE     U   ALERT N  DENY CALLS N  ENABLE   02-DEC-91    CHARGE    D
DELETE       N   DATE                   ENTRY DATE 02-DEC-91  SORT      1234
LANGUAGE     EN                                               BALANCE        $.03
```

32
```
----TRANSACTIONS----                              ----PHONE NUMBERS----
DATE       TYPE   AMOUNT     UPDATED      PHONE NUMBER    TYP  ALRT  ATTY  CHRG
19-DEC-91  MANU  -$238.02    02-DEC-91    877-6787         A    N     N     D
19-DEC-91  MANU   $119.02    02-DEC-91    01144738081      A    N     N     D
19-DEC-91 -MANU    $12.00    02-DEC-91    5754541          A    N     N     D
19-DEC-91  MANU    $14.00    02-DEC-91    3018348926       A    N     N     D
                             02-DEC-91    7035907655       A    N     N     D
```

33
```
----CALLS----
02-DEC-91  CALL   -$1.44
02-DEC-91  CALL    -$.21
02-DEC-91  CALL   -$3.32
```

34  F1=HELP    F3=MENU    F5=COMMIT    F8=CANCEL    TERMINAL PTS.000

35  ENTER THE REGISTER NUMBER OF THE INMATE              (LIST)(REPLACE)
        COUNT: 1

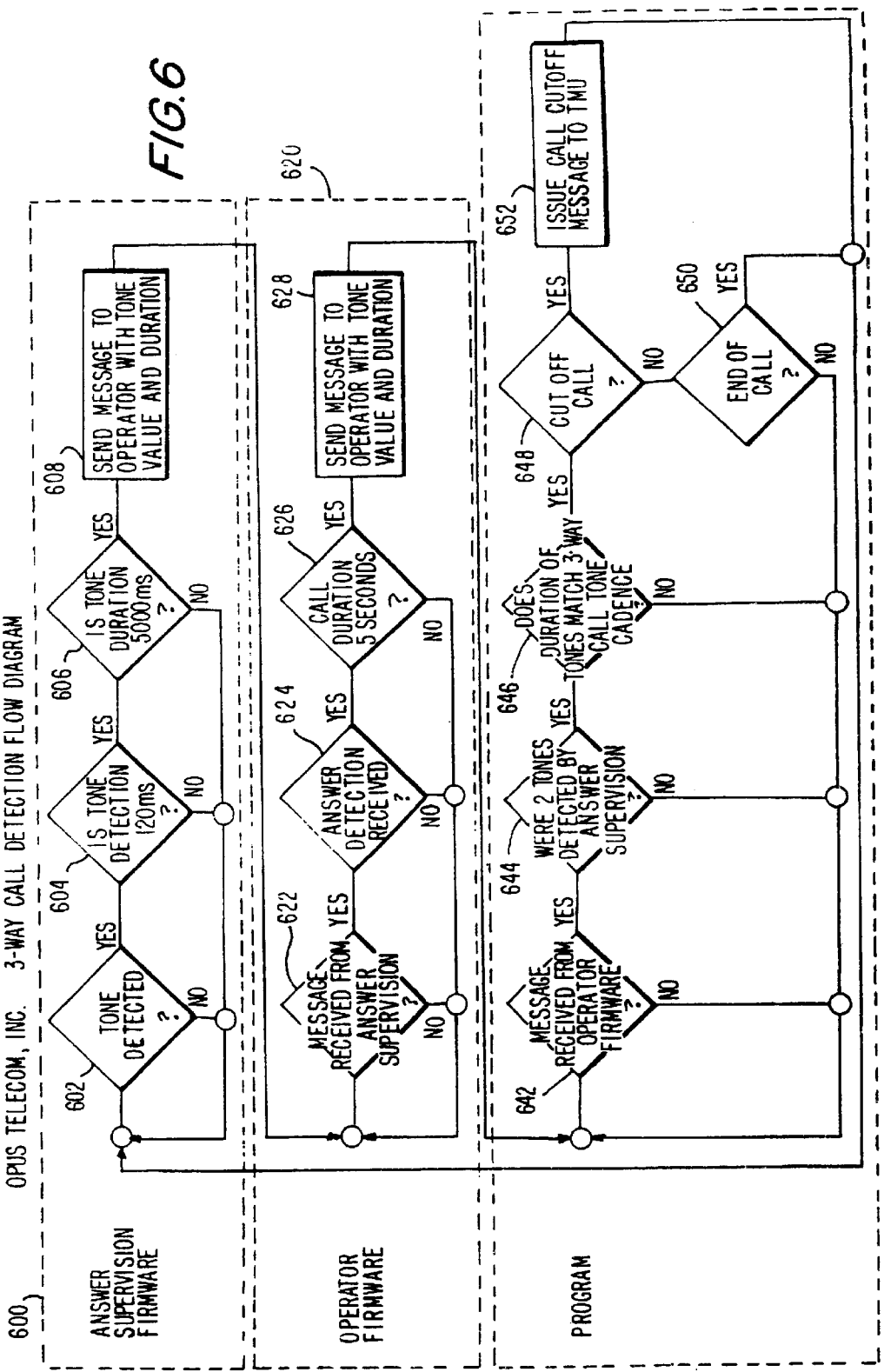

COMPUTER-BASED METHOD AND APPARATUS FOR CONTROLLING, MONITORING, RECORDING AND REPORTING TELEPHONE ACCESS

CROSS-REFERENCE TO RELATED APPLICATIONS

This application is a continuation of application Ser. No 08/726,217, filed Oct. 4, 1996, issued as U.S. Pat. No. 5,926,533, which is a continuation-in-part of application Ser. No. 08/510,327, filed Aug. 2, 1995, issued as U.S. Pat. No. 5,655,013 which is a continuation of Ser. No. 08/229,517, filed Apr. 19, 1994 now abandoned.

FIELD OF THE INVENTION

The present invention relates generally to the fields of telecommunications and penal institution management. More particularly, the invention relates to a computer-based method and apparatus for controlling, monitoring, recording and reporting access to outside telephone lines in a controlled, institutional environment, such as a prison, military base, hospital, school, business or government organization. Specifically, this invention relates to apparatus for detecting when a called party has proceeded to bridge together one telephone call with another telephone call, through the detection of dial tones, dual tone multi-frequency (DTMF) tones, special information tones (SIT), ring signals, busy signals, dial tones, other call progress tones, or similar tone signals, without the necessity of sensing or detecting hook switch or flash signals, which may be problematic.

BACKGROUND OF THE INVENTION

Generally, the need to control access to outside telephone lines in an institutional environment is well recognized. In order to prevent individuals from incurring large, unaccountable telephone costs which the institution ultimately bears, one must either restrict access to outside telephone lines or institute accounting controls whereby the costs of unauthorized calls can be billed to the responsible individuals.

Telephone systems in correctional environments require additional security considerations. Without appropriate controls on telephone access, inmates have been known to use the telephones to harass outside parties (such as witnesses who testified against them, attorneys who prosecuted their case, employees of the courts, etc.), to perpetrate fraudulent schemes, and to participate in criminal conspiracies (such as arranging the smuggling of contraband into the prison, directing an outside criminal enterprise, plotting escape attempts or credit card fraud). Therefore, it is critically important for correctional management officials to carefully plan, control, monitor and record inmate access to outside telephone lines.

One of the most fundamental problems—which exists both in correctional and other business-oriented institutions—is cost control. To achieve cost control, it is critical that there be individual accountability for each call that incurs a charge to the institution. Such accountability is typically achieved through use of personal identification numbers ("pins"). Before making a call from an institution telephone, an individual must enter his PIN. The telephone service provider is then able to deliver to the institution an end-of-the-month telephone bill which lists, in addition to the cost of each call, the PIN or name of the individual who made the call. From this information, the institution can then collect reimbursement from individuals for the costs of certain calls.

While this system of end-of-the-month call accounting functions reasonably effectively in a business like environment, it does not work well in a penal institution. The reason is that inmates show little concern for phone bills they can't afford to pay. Thus, the institution is often forced to absorb the costs of phone calls by its delinquent inmates. Moreover, the fact that account balances are only computed periodically—i.e., every month, week, or even every day—permits the inmate to accrue large, uncollectible phone bills before his access to the phones can be terminated. Traditionally, penal institutions have addressed this problem by restricting inmates to collect calls only. This, however, still provides the inmates with relatively unlimited access to the outside world, leaving open numerous opportunities for fraudulent and criminal activity, as explained below. Therefore, in a penal environment, it is highly desirable to regulate phone access on an individual, pay-in-advance basis, and to immediately and automatically terminate an individual's phone access when his/her paid-up account reaches a zero balance.

Another problem in penal institutions is the inmates' desire to make threatening or harassing phone calls to witnesses, prosecutors, police officers, parol officers, psychologists, judges, and the relatives and family of such persons. Limiting the inmates' access to collect calls only, does not effectively address this problem, since an inmate can easily identify himself (to an operator) as someone from whom the recipient would likely accept a collect call. Rather, one should, at a minimum, provide a means that permits a potential call recipient to identify the caller as an inmate before accepting the call, whether that call is placed on a prepaid or collect basis. Conventionally, this is done by initially placing the inmate on hold and playing a pre-recorded message telling the recipient that a call has been placed from a correctional facility and that, if the recipient wishes not to receive the call, he/she should hang up before the call is connected. This approach mitigates, but does not fully solve, the harassment problem. In particular, it is still possible for an inmate to repetitively call an outside party; even if the recipient hangs up after hearing the pre-recorded message, the harassing effect of receiving repetitive calls from inside the correctional institution remains. Therefore, it would be highly desirable to provide an institutional telephone system that automatically prohibits inmates from attempting to call certain outside persons. Moreover, it would also be highly desirable to provide a method and apparatus for allowing a recipient of an undesired call from an inmate to easily and automatically prohibit all future calls from that particular inmate, or from all inmates generally.

Still another concern in correctional institutions is the regulation of access to telephone systems. For various security and management reasons, it often desirable to restrict a given inmate's telephone access to particular phones, calling times, and to limit the length of calls, number of calls, and number of calls to the same number. Also, to enhance security and discipline, it should be possible to instantaneously revoke an inmate's calling privileges, or to otherwise modify the extent of a particular inmate's calling privileges.

Correctional institutions also typically wish to monitor and/or record outgoing calls. Inmate-to-attorney calls, however, cannot legally be monitored or recorded. Moreover, certain inmates—those who represent particular security risks—deserve live monitoring, as opposed to mere recording. Thus, it would be highly desirable to have a system which automatically initiates the appropriate monitoring and/or recording depending upon the identity of the inmate placing a call and the recipient of the call (i.e., attorney or non-attorney). Likewise, it may be desirable that calls to certain numbers are to be monitored live, while others need only be recorded.

Because the message content of inmate-to-attorney calls cannot be legally recorded or monitored, such calls can serve as a conduit for the inmate's illegal telephone activity. Therefore, it would be highly desirable to have a system which could passively—that is, without in any way monitoring or recording what is actually being said—monitor inmate-to-attorney calls to ensure that: (1) the only two people speaking on the line are the inmate and attorney, and/or (2) no DTMF tones, rapid line impedance changes, off-hook conditions or voltage spikes appear on the line. Techniques for voice identification are known—i.e. U.S. Pat. Nos. 4,993,068, entitled UNFORGEABLE PERSONAL IDENTIFICATION SYSTEM and 5,150,357, entitled INTEGRATED COMMUNICATIONS SYSTEM, both incorporated herein by reference—but have not been previously used in penal telecommunications applications.

One patent, U.S. Pat. No. 4,726,057 to Doerry et al. explained many of the problems brought about by the deregulation of the telephone industry in the United States. That patent states: "Prior to a June, 1984 FCC decision, pay telephones were the exclusive province of the various Telephone Companies while others were precluded from the business of providing pay telephone service. Today, however, subject to state Public Utility Commission regulations, Customer Owned Coin Telephone (COCOT) service is permitted, but a number of non-trivial technical challenges have been created including called party answer detection.

Coin telephones (pay phones) owned by the local Telephone Company generally utilize DC signals to signal called party answer. Such information is specially communicated between telephone central offices and then to the originating pay phone telling it when to accept the deposited coins. Such information, however, is not communicated to conventional telephones and it is only with great difficulty that called party answer can be detected. Naturally, the calling party knows when a connection is completed; but a knowledge of human frailty suggests that he not be relied upon to turn the "meter" on.

Complicating the problem of answer detection is the existence of special information messages that are provided when, for example, a telephone has been disconnected or a new telephone number has been assigned; and while certain tones are indicative of a proper answer, other tones are not. Ringing, busy and reorder signals as well as background noise and feedback from the calling party herself (sidetone) make answer detection a formidable challenge."

The problems set forth above are exacerbated by the fact that callers, such as inmates in a prison, have the ability to work in concert with others outside of the facility. For example, an inmate may be restricted from calling a particular judge who sentenced him, however, that inmate may call his spouse, who in turn may set up a conference call to the judge, thus allowing the inmate to verbally abuse the judge. Such a conference call may be prohibited by law, however, the correctional facility cannot prevent it, as the called party, in this case, the spouse, has the ability to bridge callers with other outside, unrestricted telephone lines, thus giving the inmate unrestricted telephone access.

Present attempts to solve the problem of called party bridging, or so-called third party calls, have shortcomings. For example, one attempt at resolving this problem is disclosed in U.S. Pat. No. 5,319,702, to Kitchin et al. In that patent, the need to provide an apparatus for use in conjunction with so-called "local equipment/telephone." When the local equipment/telephone is in telecommunication with a remote telephone, (i.e., when a telephone call is established therebetween), the apparatus is capable of indicating whether the remote party has performed a specific act causing the generation of a hook flash-type signal which is detected by the apparatus. In that patent, the detection of a hook flash-type signal is presumed to solve the problem of unauthorized calls to third parties, such as a telephone call from an inmate to the judge who sentenced him, as set forth above. The apparatus of that patent includes a band filter for passing energy having certain frequencies and an energy detector for detecting a specific electrical energy pulse having been filtered by, i.e. passed through the filter, and having a predetermined minimum magnitude. The apparatus of that patent further describes in part software (referred to as window analyzation means) which cooperates with the energy detector to detect a specific event(s) occurring on the telephone line during a predetermined maximum time window following the detection of a specific pulse on the telephone line, i.e., when a telephone call is in progress between the local party/equipment and the remote party. The detection of a specific event(s) on the line provides an indication as to whether the remote party has performed a specific act such as (1) attempting to initiate a 3-way conference call, (2) accepting a call or the charges therefor, (3) terminating a call before the local equipment/party terminates the call, and (4) dialing a specific number on a remote rotary/pulse telephone. Further, the apparatus of that patent is said to be suitable for use in a computer controlled telephone wherein the energy detector detects when a called party has answered a call initiated by the computer operated telephone and dialed a pulse/dial telephone or activated (flashed) the hookswitch. The energy detector is said to do this by measuring incoming electrical signal energy in a particular frequency band. Then, according to that patent, the software window analyzer cooperates with the energy detector to provide efficient and reliable protection of a called party's pulse dialing of a digit (usually a "zero") to verify the called party's acceptance of a call or a collect call or the called party's attempt to activate 3-way calling by flashing the called party's telephone hookswitch.

The energy detector of U.S. Pat. No. 5,319,702 to Kitchin et al. is also said to include an absolute value level detector circuit that determines when an energy pulse having passed through the band filter is above a predetermined level. If above a predetermined level, the information is transmitted by the energy detector to the apparatus' controlling computer. As previously mentioned, the apparatus further includes software, i.e., the aforementioned window analyzer, for cooperating with the energy detector to detect specific event(s) occurring on the telephone line during a predetermined maximum time window following a detection of the specific pulse. In the situation where the apparatus according to that patent is said to be designed or programmed to detect a remote party's attempt to initiate a 3-way conference call, the software window analyzer is said to include a timer or timer means for cooperating with the energy detector so that the timer begins running for a first predetermined period when a specific energy pulse is detected by the energy detector. The software window analyzer also includes sound detection means for detecting sound on a telephone line and for cooperating with the timer so that the sound detection means is activated at the end of the first predetermined period for a second predetermined maximum time period. If sound is not detected during the second predetermined time period, such indicates that the remote party has attempted to initiate a 3-way conference call.

Kitchin discloses a type of energy detector that can also incorporate a ringback detector—not to activate third party call blocking, but merely for activating the energy detector when the ringback signal is detected. Thus, the ringback detector is used to set the energy detector, so that the energy detector can purportedly carry out the purpose of that patent, and so that the energy detector can be utilized. Indeed, Kitchin states that "[t] hose skilled in the art will appreciate that called party answer is indicated when the first specific energy pulse is detected after the apparatus has detected the called party's ringback signal." Thus, the ringback signal is used to initialize the Kitchin system—not to solve the problem at hand. In that sense, Kitchin teaches away from relying upon the use of ringback detection as a means to block third party calls.

The Kitchin patent discloses "being useful for detecting certain specific events, i.e., call answer, an attempt to initiate a 3-way conference call, call acceptance, call termination, and determining the specific number dialed number on a rotary/pulse telephone. Any event which causes the generation of the hook flash-type signal such as a call waiting signal can purportedly be detected. Importantly, Kitchin says that it can detect "any event which causes the generation of the hook flash-type signal". This is important because that is the entire focus of the Kitchin patent—to detect hook flashes, or the energy pulses associated therewith. This approach is problematic, as it relies on the detection of a pulse—not the detection of certain tones. While the Kitchin patent may appear to be an elegant solution to the problem of blocking third party calls, it is needlessly complex, and if anything, complicates the process of detecting the attempted establishment of third party calls. The prior art does not teach the simple, direct method of sensing third party call patterns by merely monitoring the occurrence of tones that called parties traditionally generate in their efforts to bridge callers with third parties. In essence, many called parties allow the caller to be on the line while they dial the third party—that is an opportunity to sense DTMF tones. Then, many called parties may dial the wrong number of the third party, and a SIT tone will indicate that number may have been disconnected, subject to an area code change, or the like—all while the caller is on the line. That is another opportunity for sensing tones to prevent third party calls. Also, called parties may use a credit card to call third parties—also while the caller is on the line. Call progress tones may be generated during such credit card calls—thus, yet another opportunity to sense tones to prevent third party calls. Also, if at any time during the call, a ring or busy signal is heard on the caller's telephone, still another opportunity is present for sensing tones to prevent third party calls. And finally, if at any time during the call while the inmate is on the line, a dial tone occurs (as when a called party may go off-hook to place the call to the third party), yet another opportunity exists for sensing tones to prevent third party calls.

SUMMARY OF THE INVENTION

In light of the above, one object of the invention is a method of managing telephone activity in an institutional environment to achieve improved security and reduced cost.

Another object of the invention is a system adapted to perform such improved institutional telephone management.

Yet another object of the invention is a method and apparatus for passively monitoring a telephone connection to detect security breaches.

A still further object of the invention is an institutional telephone management system wherein the parameters that control the operation of the system as well as the records of system activity are stored in a central database, thereby permitting simple customization of system operation, generation of reports and monitoring of status.

In accordance with one aspect of the invention, a method of managing telephone activity in an institution includes the steps of: (1) identifying an institutional caller (the "calling party") who wishes to place an outside call to an outside recipient (the "called party"); (2) blocking the institutional caller and —while the institutional caller's line (earpiece and/or mouthpiece) remains blocked—(a) calling said outside recipient (called party), (b) providing the identity of said institutional caller to said outside recipient and © receiving a control code from said outside recipient; (3) determining, in response to said control code, whether to connect the institutional caller to the outside recipient, and optionally, whether to indicate any of a plurality of messages to the calling party, e.g., an inmate, and (4) terminating or otherwise tracking or accounting for calls to third parties whereby attempts are made by the called party to bridge or conference the calling party (the caller or inmate) with any third party.

In accordance with another aspect of the invention, an apparatus for managing telephone activity in an institution includes: a plurality of institutional telephones located within the institution; a trunk management unit (TMU) for selectively connecting the institutional telephones to one or more outside telephone lines, wherein the TMU includes means for decoding DTMF tones generated by the institutional telephones or received from the outside telephone lines; and a computer control unit (CCU), coupled to the TMU, for controlling the connection of the institutional telephones to the outside telephone lines based upon DTMF tone(s) received from the outside telephone lines. A database associated with the CCU contains information regarding the calling privileges of each person within the institution. In a preferred embodiment, the TMU—prior to connecting the call—plays an announcement to the called party identifying the institution and caller, along with the options available to the called party. In response, the called party may enter the announced DTMF tone sequence (preferably GOTU), which modifies a record in the database, thereby prohibiting the caller (and/or other similarly situated prospective callers) from calling the called party in the future.

Other features of the TMU provide security and monitoring functions. The invention provides three levels of monitoring, any or all of which may be active for any given call. The first level is "live" call (voice) monitoring, where the prison officials actively listen to a live call. The second level is call recording. The TMU can be programmed to enable associated recording equipment to record telephone calls. The third level is "passive" line monitoring, where the TMU detects, for example, DTMF tones, off-hook conditions, voltage spikes and/or sudden line impedance changes, in order to thwart attempts at unauthorized three-way calling, call conferencing, call transferring, call forwarding or re-dialing via various alternate common carriers, many of whom now offer "1-800" or local telephone number (e.g., "950") access numbers. Also, care is taken to avoid disrupting calls that do not represent security breaches, by preventing false triggering of the above "passive" line monitoring features. For example, with respect to DTMF tone blocking, the TMU will look for any additional digits entered by an institutional caller, such as an inmate, to prevent the inmate from redialing to other telephone numbers that may not be authorized. However, to prevent "talkoff", whereby the normal telephone conversation can falsely trigger a disconnect signal (because the TMU may interpret the conversation as DTMF dialing), the TMU can be set to look at the number of digits dialed within a specified time period (e.g., six (6) digits within a fifteen (15) second time period, or any variation of the two parameters) and thereby, determine whether the audio information is indicative of unauthorized DTMF redialing or just a normal speech or voice pattern.

In accordance with the preferred embodiment of the invention, all calls are passively monitored and all calls that can be legally recorded—i.e., all but inmate-to-attorney calls—are recorded. At any time, prison officials can selectively invoke live monitoring to listen in on any call in progress, except an inmate-to-attorney call. System alarms, which trigger any time a particular inmate places a call or calls a certain person, allow officials to determine when live call monitoring is appropriate. Likewise, the telephone system of the present invention can be programmed to default in any manner. For example, the system can be set to place only those telephone calls that are among a pre-approved list of telephone numbers. Conversely, the system can be set to place all telephone calls except those that are among a list of restricted telephone numbers. Optionally, the telephone system of the present invention can include speed-dialing, whereby upon entering a PIN, for example, an inmate can enter "11" followed by the "#" key. In that case, the prison administrator may have established that "11" is the speed-dialing sequence for that inmate's mother. Of course, the system could be configured so that the inmates themselves can program the telephone system with speed-dialing digits, however, a principal objective of speed-dialing is to save time at the telephone, thus making the telephones available to the largest number of inmates in the shortest possible time period.

In addition, the invention may include biometric voice verification features. The TMU, for example, may digitize a sample of the caller's voice. The CCU then compares the digitized sample with a stored voice print, to verify the identity of the caller. Such biometric monitoring may also be used in a passive call monitoring mode, wherein periodic samples of the caller's voice are provided to the CCU—and checked against a list of authorized voice prints—to ensure that no unauthorized callers are participating in a call, and to ensure that inmates are not sharing or selling relatively liberal calling privileges associated with a particular PIN or inmate account to other inmates that are subject to more limited calling privileges. The use of biometric voice verification (or "voice prints") can prevent PIN abuse in general. For example, if a particular inmate with restricted calling privileges, or no available funds, attempted to force (e.g., by threatening physical attack) another inmate with relatively non-restricted calling privileges (or available funds) to turn over his PIN, biometric voice verification would obviate this problem, as the voice would be used to validate entry into any inmate account.

The principal feature of the present invention is the implementation of a way to detect inmate or other regulated caller telephone calls to called parties, whereby said called parties act to bridge the inmate or regulated caller to some third party. Whereas regulated callers, by definition herein, are only permitted to communicate with certain called parties, the authority in charge of the caller or inmate's calls are afforded the ability of preventing called parties from bridging telephone calls from inmates or other regulated parties to unauthorized or unknown third parties. Said authority has, at its option, the ability to prevent, terminate and/or track or monitor any of said attempts.

Broadly, the present invention takes the form of an apparatus and method for detecting and identifying disparate preselected signal sequences of spaced tone bursts. Such spaced tone bursts or tone signals may be originated by the called party in a called party's effort toward bridging the caller or inmate with a third party. Such tones are the tones often generated during such bridging attempts, such as the ringing of the third party's telephone, a busy signal during the attempted calling of a third party by the called party, a dial tone as the called party is dialing the number of the third party, SIT tones generated when the called party attempts a telephone call to a third party whose number has been, for example, disconnected, other call progress tones, such as those associated with telephone credit card usage, other DTMF tones, for example, those used by the third party to call the third party in the first place, and any other tones, thus obviating the need for any detection of hook flashes or other clicks and/or pops on the telephone line, that may unreliably be associated with attempts by called parties to place telephone calls to third parties.

In some further specific aspects of the invention, logic circuitry comprises gates and registers. The latter is used to store durations of tone bursts and spaces which the gates compare for consistencies with a preselected signal sequence. Further gates are utilized to detect one of a plurality of preselected error conditions. Occurrence of an error condition is used to override indication of a valid signal sequence and to identify possible malfunctions in apparatus used to generate the preselected signal sequences. The storage of certain tones may be desired, for example, with ring or busy signals. As those tones are often associated with specific cadences (ring $\frac{2}{3}$ on, $\frac{1}{3}$ off, and busy 50% on, 50% off), the sensing of cadence in addition to tone frequency can improve system reliability. The detection of tones can be accomplished by certain integrated circuits, such as the Teltone brand series of chips, designed to detect and digitally decode DTMF and/or SIT tones. Typically, DTMF tones are the 12 conventional Touch Tones (1-9, 0, # and ★), and SIT tones are generated by the local central office equipment when a call does not go through, for example, if a number is blocked from a particular telephone number, a number is no longer in use, a number has been disconnected, an area code has been changed, etc. With the present invention, such tones (DTMF or SIT), or other tones (dial, ringing, busy or call progress tones) are used to signal an inmate or other regulated telephone system that a called party (a party called by, e.g., an inmate) is attempting to bridge that telephone call together with some unknown and/or unauthorized third party. Upon the detection of such a tone (call progress tone or other tone), the present invention may either terminate the call between the inmate and the called party, or may evaluate what third party was called, to attempt to validate such a third party call.

Also, with the present invention, the third party call attempt may be stored, for present or future review by an institutional authority, and patterns may be monitored, so that prison officials may consider curtailing future inmate calls to particular called parties. Thus, third party call attempts can be tracked, both on a per inmate and on a per called party basis.

Thus, if inmates A through G all know to call a certain called party X so that called party X can bridge them to their respective unauthorized third parties, then, the prison officials will know that future calls to party X are to be blocked, regardless of who is initiating such a call, because called party X is suspected of being an individual who facilitates unauthorized third parties. Importantly, certain called parties may even attempt to bridge a call from one inmate to another call from another inmate. In that instance, keeping track of such attempts, and terminating such calls, is particularly important, as inmates within the same institution may be conspiring to do crime, such as breaking out of prison.

The present invention relies on some of the same circuitry used by certain customer owned coin operated telephones (COCOTS) and other facility based PBX equipment. Some such pay telephone stations are provided with apparatus for detecting when a called party has answered a call (initiated at the coin telephone station) by tracking call progress tones, and sensing tone cadence. The apparatus of the present invention may also include circuitry for inhibiting the indication of called party answer when a sequence of three predetermined (such as SIT) tones are received; such tones generally precede an intercept message such as one that announces that a telephone number has been changed or disconnected. The apparatus further includes circuitry for inhibiting the indication of called party answer when call progress tones are detected. Finally, the present invention can sense DTMF tones themselves, often used in the completion of calls by Touch Tone telephones.

The present invention thus obviates the need to rely on sensing clicks or pops associated with attempts by called parties to bridge calls via conference call circuitry or call waiting. Such reliance is disadvantageous. First, depending upon the local exchange carrier switch, call waiting and call conferencing, as provided by the telephone companies, may not even generate any click or pop (or other suitable pulse that could activate the Kitchin circuitry). Also, the circuitry of Kitchin is susceptible to false triggering, as it senses impulses that can occur randomly. To the contrary, applicant contends that the invention set forth herein is simpler and more accurate, certainly insofar as false triggering is concerned. Applicant contends that the sensing of tones exclusively as a means to restrict third party calls will lead to far less false triggering as compared to the Kitchin proposal. As applicant's invention is not directed to sensing third party call attempts that do not involve tones, applicant senses only tones—not impulses associated with hook flashes, as Kitchin requires. To the contrary, applicant contends that the present invention obviates the need for that by sensing other criteria that may be indicative of an attempt by a called party to bridge one telephone caller with another.

BRIEF DESCRIPTION OF THE DRAWINGS

The detailed description below describes the preferred embodiments of the invention and is intended to be read in conjunction with the set of drawings, in which:

FIG. 3 is an exemplary screen showing an institutional user's calling privileges and activity;

FIG. 6 is a flow diagram depicting the operation of applicant's third party call detection system.

DETAILED DESCRIPTION OF THE PREFERRED EMBODIMENTS

The preferred embodiment(s) will be described with reference to prison based call management. This, however, should not be viewed as limiting, since the invention is also applicable in other institutional settings such as military bases, schools, mental institutions and business organizations.

Figure 1:
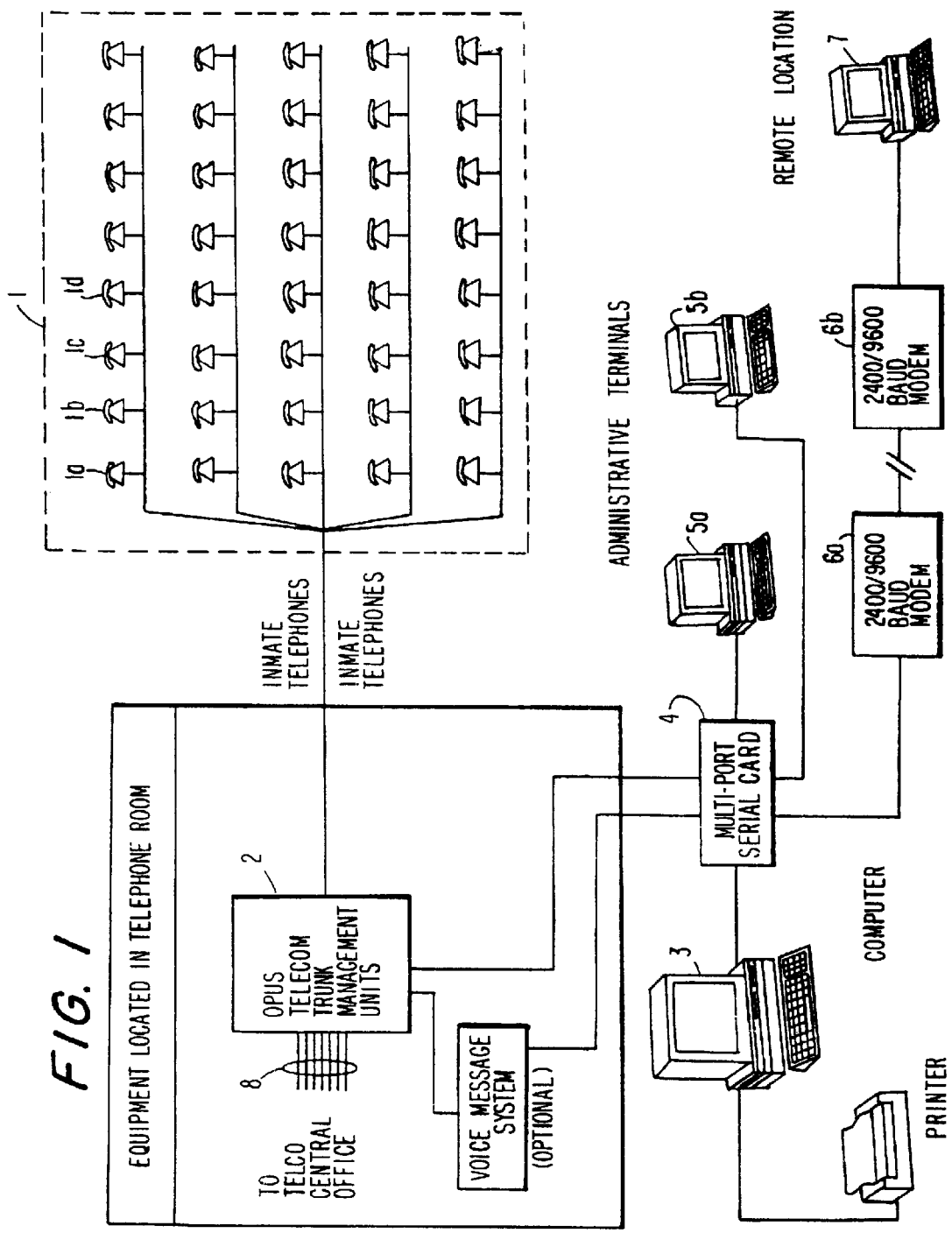
FIG. 1 is a block diagram showing the major components of a preferred apparatus, including a plurality of institutional telephones, a computer control unit (CCU) and a trunk management unit (TMU)

Referring now to FIG. 1, a call management system manages calls from a plurality of inmate telephones 1. A TMU 2 controls the connection of individual inmate telephones (for example 1a) to outside telephone lines 8, and electronically monitors connected calls. A TMU 2 can optionally contain (and/or be connected to external) voice messaging or voice synthesis equipment, to facilitate features such as over-the-phone voice prompting, voice mail, or any voice activated, responsive or interactive telephone feature. For example, an inmate could enter his/her PIN into a telephone 1 keypad, and then, access his/her account. In turn, voice equipment associated with or contained within the TMU could inform the inmate of the exact balance available in his/her account for future telephone calls. Additionally, the inmate could ascertain how much any prior telephone call has cost, and further, could dial an intended telephone call, and ascertain how much that call will cost for the first time period (e.g., the first minute), or, find out how many minutes the inmate can be connected to that telephone number, given the cost of that call and the amount remaining in the inmate's account, all prior to actually completing the call and becoming obligated to pay for it. Obviously, for debit-based systems, inmate calls will not be placed in the event that sufficient funds are not available. Further, if during a call connection, inmate funds become nearly exhausted, a warning tone could inform the inmate of that condition, so that the inmate can terminate the conversation, and take appropriate steps to replenish his/her account. Such warning tones could be made possible by a real time call cost monitoring system, that compares inmate call costs and inmate account balances while each call is in progress.

A serial interface card 4 digitally interfaces TMU 2 to: a CCU 3, one or more administrative terminals 5a–b and, via data modems 6a–b, and to a remote terminal 7. Of course, remote terminals 7, administrative terminals 5 and CCUs 3 can be connected via so-called dedicated data/telephone line services, obviating the need for actual modems 6. Alternatively, TMUs 2 may share a common local area network. Such an alternative structure can accommodate data transfers, digitized voice signals, data packet transmissions, call processing data, and the like. In such an alternative embodiment, the local area network may even facilitate packet communications between individual TMUs or the TMUs and their respective hosts.

TMU 2 communicates bi-directionally with CCU 3. In one direction, CCU 3 directs TMU 2 to connect, record, passively monitor and terminate calls, and to download and/or play prerecorded messages to an inmate or outside call recipient. In the other direction, TMU 2 monitors the real-time status—i.e. off-hook, DTMF tones, voltage spikes and rapid impedance changes—of institutional and outside telephone lines. In addition, TMU 2 can provide digitized voice samples to CCU 3 in order to record messages (such as the inmate's name) and to support biometric voice verification or monitoring functions. Optionally, TMU 2 (or other comparable apparatus) could be LO configured to provide digitized voice samples to, for example, CCU 3, for each call made, whereby such samples are sufficient in length to provide verification that the inmate indeed participated in a conversation with a particular called party on a particular date and at a particular time. Because prison administrators may not wish to charge inmates (or in the case of collect calls, called parties) for certain calls (for example, calls the administrator deems incomplete), it is critical that administrators have the ability to verify actual telephone communications. Incomplete telephone calls may include, for example, busy signals, calls that do not "go through", calls that are not answered (as distinct from calls that reach answering machines, which may be deemed complete), etc. Thus, if an inmate or a called party subsequently claims that a particular telephone communication never occurred (e.g., a busy signal was reached, the called party never answered, or no voices were spoken at all), the prison administrator can retrieve the voice verification record to evaluate whether, e.g., a credit is due, telephone system repair is required, or whether claims that certain calls were incomplete are false.

Figure 2:
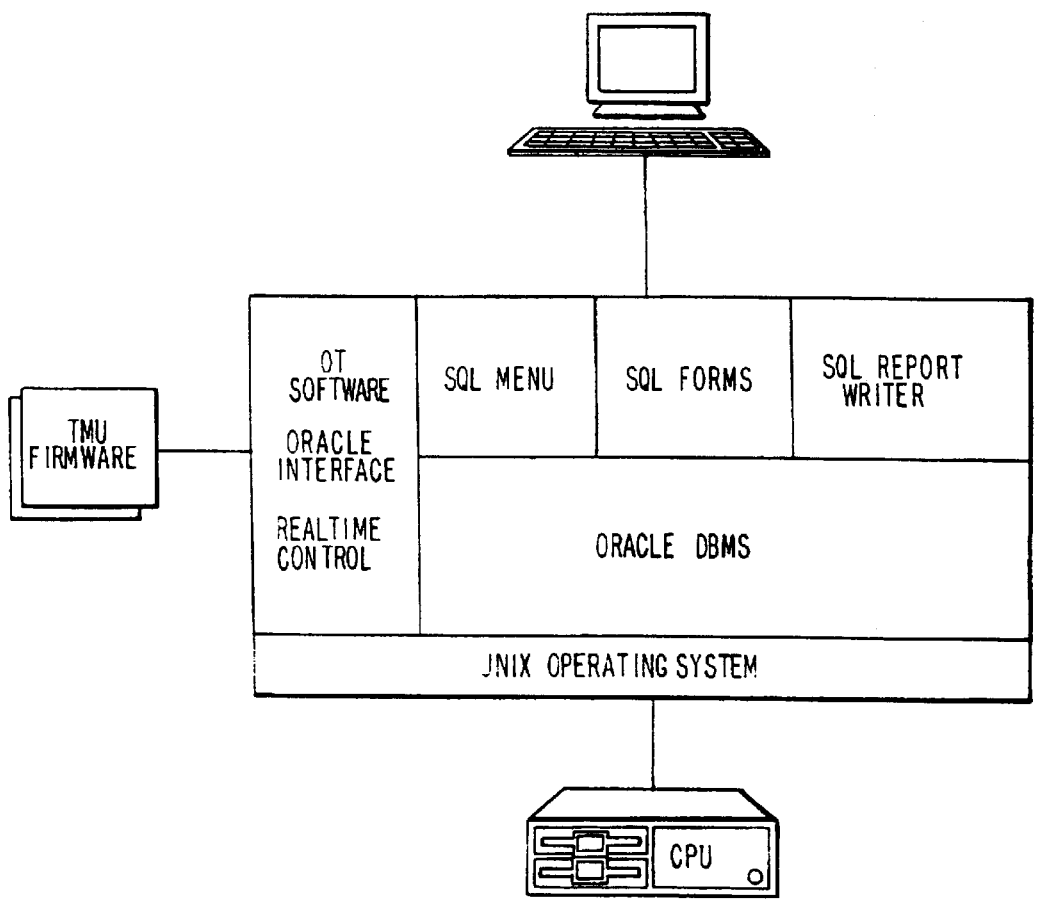
FIG. 2 is a block diagram showing the software and firmware architecture of the TMU/CCU apparatus.

Referring now to FIG. 2, CCU 3 is preferably a "486" personal computer or larger "super-mini" type computer configured to operate under a suitable operating system, such as UNIX™ System V. Of course, any number of operating systems will be suitable for the purpose of the present invention. In addition to the operating system, a database management system (DBMS), such as ORACLE™, which includes a structured query language (SQL) interface, is used to store system configuration and status information. A SQL forms generator provides access to the stored configuration and status information. A SQL menu program allows users to easily navigate the database system. A SQL report writer is used to generate reports of calling activity or other system usage.

TMU firmware controls the operation of TMU 2. TMU interface software in CCU 3 is configured to manage communication between TMU 2 and CCU 3. ORACLE interface software provides a simple, menu based interface to field users such as correctional officers and management officials. Real-time control software manages the real-time activity of the system and responds to communications from TMU 2 and user inputs from CCU 3 or terminals 5a–b and 7.

From an administrator/user perspective, the CCU software supports the following general functions:

(1) establishment and configuration of individual inmate data and monetary accounts;

(2) checking of inmate debit (i.e. paid-in-advance) accounts;

(3) setting of global (i.e. institution wide) and individual restrictions on telephone access;

(4) real-time monitoring of inmate telephone calls and alerts (based on call content, security breaches, etc.), along with the ability to cut off inmate calls individually or globally;

(5) storing and reporting of detailed inmate call details and account information; and (6) storing and reporting of telephone usage data.

Referring now to FIG. 3, an exemplary form 30 provides easy access to various information regarding an inmate's debit account, calling privileges and calling activity. The FIG. 3 form includes a title segment 31, which displays the current date, title of the form and form code. Below the title segment is a header segment 32, which typically displays such information as the inmate's name, registration number, preferred language selection, prisoner account code ("PAC", or PIN), certain calling privilege information and account balance. Below the header are a plurality of data blocks 33, which show the inmate's transactions (both accounting transactions and phone calls) as well as his/her calling privileges and restrictions—i.e., numbers the inmate is allowed to call, the inmate's attorney's number, numbers the inmate is prohibited from calling, and numbers which should trigger an alert on the system terminals when a call is attempted. The system allows the user to scroll through the data blocks in order to bring any particular transaction or restriction into view. A help line 34 lists the commands available to the user. A bottom positioned status line 35 completes the form. Form 30 may be expanded as desired to facilitate keeping track of which inmates have attempted to call called parties, who in turn make an effort to conference in a third party. Where the called party has the inmate on the line while the called party dials the third party, the TMU may sense the telephone number of the third party, and record that information as well in form 30. Thus, form 30 may contain a listing of the called numbers (as in segment 33), and may also contain the numbers that the called parties attempt to bridge together with the inmate. Also, other forms like form 30 may be generated on a per third party basis. In that manner, if multiple inmates tend to call the same called party, and that called party tends to bridge inmates to unauthorized third parties, including even to other inmates, the prison officials can read such a report, on a per third party and/or even called party basis, to evaluate whether to restrict inmate calling privileges, and to evaluate whether to restrict calls globally to one particular called party.

Figure 4:
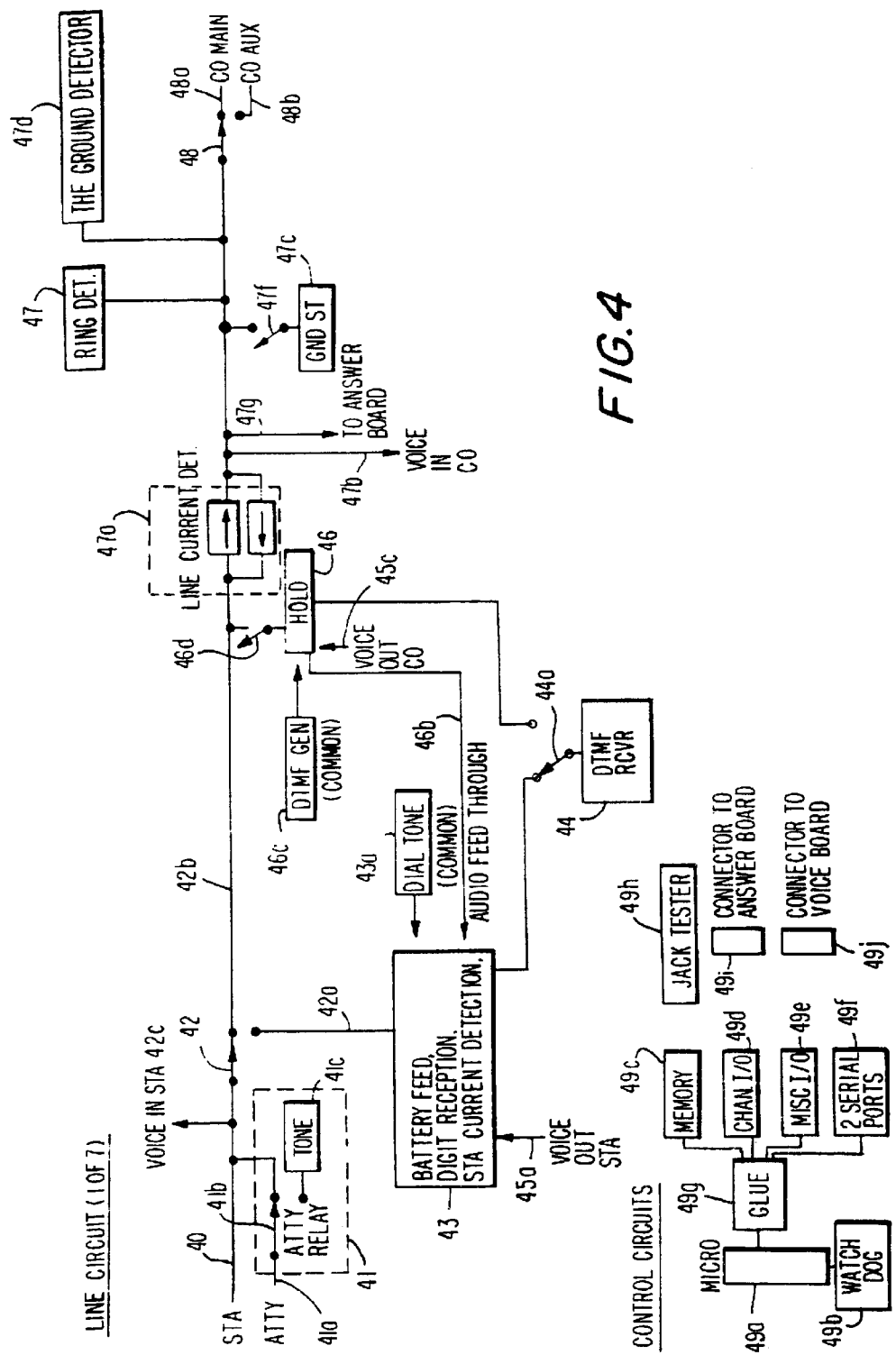
FIG. 4 is a block diagram of a TMU.

Referring now to FIG. 4, a block diagram of one channel of a multichannel TMU 2 is shown. Generally, TMU 2 includes circuitry to selectively connect inmate phones with outside lines, to selectively monitor and record the connection, and to generate appropriate voice instructions or prompts to the inmate and/or the outside call recipient.

As depicted in FIG. 4, a channel of TMU 2 connects to an inmate telephone 1 at a station input line 40. A record blocking circuit 41 connects station input line 40 to recording equipment (not depicted) via line 41a (which line can also be used for "live" call monitoring). CCU 3 automatically controls an attorney relay 41b and, in the case of an inmate-to-attorney call, switches line 41a to a tone generator 41c, thereby blocking improper attempts to record or monitor inmate-to-attorney calls.

A split relay 42 switches the inmate telephone between a local line 42a and an outside line 42b. Initially (i.e. before the inmate initiates a call), split relay 42 connects station input line 40 (via local line 42a) to a monitor circuit 43, which monitors the inmate's telephone. Monitor circuit 43 supplies a battery feed to the inmate's telephone, and performs pulse digit recognition and current detection as well. A dial tone generator 43a (which is preferably common to all channels of the TMU) supplies a dial tone to the inmate's phone. A relay 44a switches a DTMF receiver 44 to decode tones on the local line 42a or the outside line 42b. A voice-out-station line 45a supplies voice messages to the inmate's telephone. CCU 3 controls the decoder portion of an integrated coder/decoder (CODEC) circuit to generate the messages fed to line 45a. (The decoder portion of a second CODEC also drives a voice out central office line 45c to play messages to outside line 42b.) A central office voice input line 47b connects to the coder portion of the CODEC circuit to support message recording, voice monitoring and/or verification functions. Optionally, voice-in-station 42c is used to record the name of an inmate. Also optional, answer board line 47g is used to detect called party answer conditions, by detecting the presence or loss of call progress tones (e.g., ringing, busy, special-information-tones (SITs), etc.).

A hold circuit 46 is used to interact with the outside caller during the call qualification process, during which the station input line 40 is switched to local line 42a. A hold relay 46d selectively connects hold circuit 46 to outside line 42b. A DTMF generator 46c (preferably common to all channels of the TMU) is controlled by CCU 3 to, for example, place an outside call to a requested number. Hold circuit 46 interfaces with DTMF receiver 44 to detect tones generated by the outside caller during the call qualification process. The hold circuit 46 (with its associated relay 46d) can also pass audio information directly to the monitor circuit 43 as desired via audio feed through line 46b. The hold circuit 46 can also be used for dialpulse dialing to the central office. Line current detector 47a (preferably implemented using an opto-isolator), ring detector 47e, and tip/ground detector 47d monitor the status of outside line 42b. Ground start relay 47f connects a ground start circuit to the ring wire of outside lines 48a and 48b, to start "ground-start" type lines. A line relay 48 switches outside line 42b between a central office main line 48a and a central office auxiliary line 48b. Also shown are voice out (45c) and voice in (47b) ports, and a ground start (47c).

In addition to the channel circuitry described above, TMU 2 is controlled by a microprocessor 49a, which interfaces with a watchdog timer 49b and with a memory 49c, channel I/O 49d, miscellaneous I/O 49e and dual serial ports 49f via data, or so-called "glue" logic 49g. TMU 2 also includes a jack tester circuit 49h and connectors 49i and 49j to answer and voice boards, respectively. The voice board contains a plurality of integrated CODECs (preferably two per TMU channel) as well as circuitry needed to permit CCU control of the CODECs, including I/O circuitry and voice data buffers.

Figure 5:
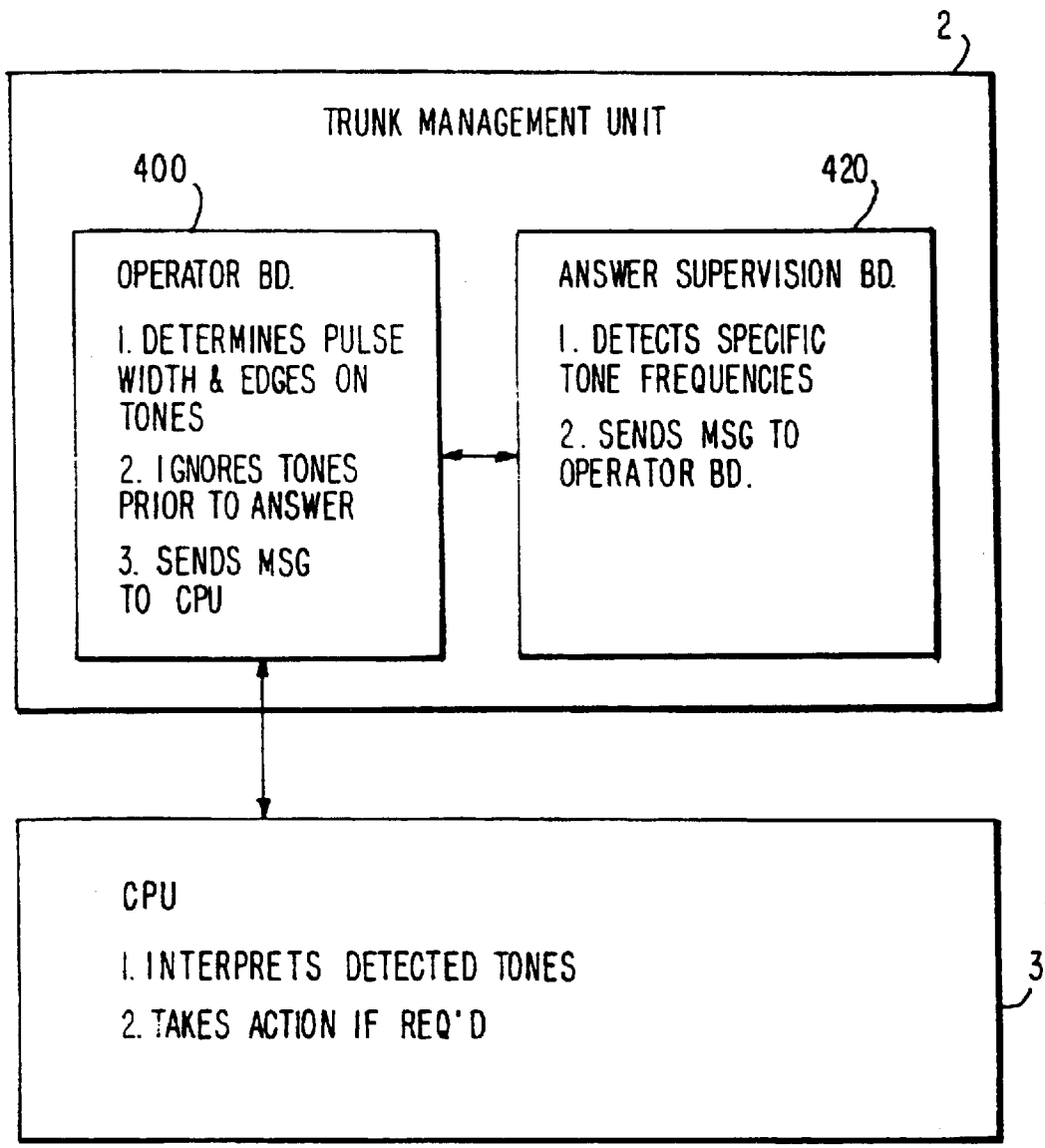
FIG. 5 is a block diagram of a TMU and CCU/CPU configured which permits third party calls to be detected.

Referring now to FIG. 5, a block diagram of a TMU 2 and CCU/CPU 3 are configured to permit third party calls to be detected. The TMU 2 includes or is interfaced to (as shown in FIG. 4, via connectors 49i and 49j) an operator board 400 and an answer supervision board 420. The answer supervision board 420 detects specific tone frequencies, and sends messages to the operator board 400. The answer supervision board 420 is capable of detecting the presence of any tones of interest, particularly with respect to the present invention, tones that may be indicative of attempts by a called party to place calls to third parties, so that the called party can bridge the caller or inmate with a third party, including unauthorized third parties. Of course, some institutions will prohibit all calls to all third parties.

Specifically, answer supervision board 420 will detect certain frequencies of interest. First of all, the answer supervision board should be able to detect dial tones, which are typically tones consisting of components at 350 & 440 Hz. Also, answer supervision board 420 should be able to detect busy signals (a combination of 480 & 620 Hz), ring signals (440 & 480 Hz), and the like. Thus, at least four frequencies are of interest (350, 440, 480 and 620 Hz). In addition, the answer supervision board 420 may contain or may be supplemented by hardware such as the Teltone brand chip suitable for sensing and decoding DTMF tones, SIT tones, other call progress tones, such as credit card validation tones, and the like. In that manner, answer supervision board 420 or other similar hardware and/or software can be established to detect tones indicative of attempts to complete third party or three-way telephone calls.

The operator board 400 communicates with the answer supervision board 420. The operator board determines pulse width and the edges on the tones. Also, as the operator board interfaces directly with CPU/CCU 3, operator board 400 must ignore tones which occur prior to the called party answering the telephone. If not, it is possible that the ringing of the called party (which is permissible) may disconnect the inmate. Thus, the monitoring of third party calls should preferably commence only after the called party answers the telephone.

Finally, CPU/CCU 3 is responsible for interpreting detected tones and taking the appropriate action. For example, CCU# may disconnect a call to a caller upon sensing a dial tone. It may also record the number the called party attempted to connect the inmate to, and it may record the number of the called party (of course). It may keep track of call history on a per inmate, per caller, per called party basis, and the like. The CCU 3 may compare the third party calls to a list of authorized calls. For example, if one particular inmate calls his attorney (a permitted call), and that attorney has received permission to set up a conference call with that inmate's physician, then, CCU 3 can be programmed to permit that caller (the attorney, based on the attorney's telephone number), to conference in only that physician (based on that physician's telephone number). In that manner, some third party calls could be permitted, while other are not. Also, with such a mechanism, it is contemplated that at one level, all third party calls are prohibited. Consequently, by hardware and/or software, all third party calls will be blocked, by applicant's invention or other methods of accomplishing the same result. Then, by applicant's invention, the called party will be responsible for keeping the inmate on the line (via an audio communication pathway), so that the inmate can "hear" the DTMF tones that the called party is dialing, to reach the third party. In that manner, the telephone number of the third party can be compared within the CCU against a list of approved third party number for that inmate, and the CCU 3 may permit such a third party call, by overriding the blanket prohibition of all third party calls, for that one instance. In that manner, some third party calls may be permitted, and others not. Of course, the prison authorities may specify any level of prohibition or permissive third party calling, and the CCU 3 can be programmed to handle any level, and keep track of any level.

The CCU 3 can also handle other functions, such as taking appropriate measures in response to certain tones. Also, the tones may be monitored for their frequencies, pulse widths and even period, duration, cadences, etc. For example, busy signals are often a 50% on, 50% off cadence, while ring signals are usually 33 and a third percent on, and 66 and two-thirds percent off. Thus, CCU 3 can be used to detect signal characteristics, such as cadence, to ensure that the correct tone signal has been interpreted.

FIG. 6 is a flow diagram depicting the operation of one example of applicant's third party call detection system. The answer supervision firmware 600 senses whether a tone has been detected (602). If so, the duration of the tone is sensed, and if over 120 ms (604), and under 5000 ms (606), then a message (608) is sent to the operator firmware (620). It will be recognized that the operator firmware (620) corresponds to the operator board (400), while the answer supervision firmware (600) corresponds to the answer supervision board (420). If the operator firmware (620) receives a message (622) form the answer supervision firmware (600), and if the called party has answered his or her phone (624), and if the call lasts beyond 5 seconds (626), a message (628) is sent to the 3-way call monitor program (640), which is implemented by hardware, such as CCU 3 and software. Program (640) senses messages (642) from the operator firmware (620), and if a message was received, certain decisions and actions are taken. First, two tones must be detected (644) by the answer supervision firmware (600). This is so because dial tones, ring tones, busy tones, SIT tones, DTMF tones, call progress tones, etc., are all two-frequency tones, and hence, step (644) filters out those tones that are mono-tones. Also, particularly with respect to ring signals and busy signals, the cadence can be sensed (646), and if a match is found, the call can be cut-off (648) and ended (650), and the TMU 2 can be released (652).

Naturally, many variations of this apparatus are possible, so that any particular tone sequence can effect any desired operation. Also, records of call history, attempts to bridge calls, and any other statistics, can be kept as well, as CCU 3 can be a computer with any desired database.

Generally, the method of connecting an inmate call was discussed in the parent applications hereto, Ser. No. 08/510,327, filed Aug. 2, 1995, which is a continuation of Ser. No. 08/229,517, filed Apr. 19, 1994, herein incorporated by reference.

TMU 2 continuously monitors the inmate telephones 1. To place a call, an inmate picks up a phone and enters two numbers (in any order established by the facility): (1) his/her personal identification number (PIN); and (2) the number to be called. TMU 2 forwards both numbers to CCU 3, which, in turn, queries the inmate's account to check whether:

(1) there are sufficient funds in the inmate's debit account to make the call (unless the call is a collect call);

(2) the particular inmate is allowed to: (a) use the particular telephone extension; (b) place calls at the given time-of-day; or © has exceeded a maximum number of calls or calling minutes within a given period of time; and (3) based upon the number to be called, whether the number is approved or prohibited, whether the number to be called corresponds to the inmate's attorney (in which case, the conversation will not be recorded or "live" monitored), and whether there are any time-of-day or call frequency or other restrictions on the number to be called.

If the call is rejected on the basis of (1)–(3) above, CCU 3 directs TMU 2 to play a message to the inmate (in the inmate's preferred language, determined by his/her PIN and established when the prisoner first enters the facility) explaining the reason that the call has been rejected. Assuming that the requested call has passed these initial screening tests, CCU 2 directs TMU 2 to call the destination party. Until completion of these steps, the inmate's earpiece and mouthpiece remain blocked (with respect to the called party), thereby eliminating the inmate's opportunity to interject offensive or harassing remarks. Subsequently, the destination or called party receives the call and hears a prerecorded message which identifies the institution, caller and gives instructions as to how the called party may elect to receive the call and how the party may block future calls, if desired. The message may also state that third party calls are prohibited for this inmate (if that inmate is restricted from third party calls), or the message may indicate that third party calls are prohibited for all inmates at that institution. Also, the message could ask for an authorization code, which the caller can enter, to override the third party blocking mechanism. In that manner, the attorney of the inmate, who may have gained a court order permitting third party calling, can enter the password to establish a third party call—either on his own, or by way of prison facility trunk lines. Also, the called party can be warned that the prison is aware the that called party previously completed a third party call, and if that called party does it again, they will be pursued by government officials. Also, automatic number identification (ANI) can be used to locate the called party that has completed such third party calls, so that the called party can be pursued, and forced to stop the offensive activity.

Typically, in many inmate systems, the pronunciation of inmate's name is stored once in the database and retrieved each time the message is generated. This eliminates the risk of an inmate interjecting a short message in place of his/her name. The pronunciation of an inmate's name may be synthesized from well-known commercially available electronic phoneme sets, or may be reproduced from a voice data file created by the actual inmate or administrator. For example, when an inmate first enters a corrections facility, he/she may be instructed to recite his/her name into a voice recorder via a microphone. Then, that voice can be stored permanently into a file associate with that inmate's calling account and/or PIN, and can be automatically replayed as desired.

In most cases, the called party is allowed a specified time to determine whether to accept the call, hang up or press a code, such as GOTU, to invoke the invention's prospective call screening feature. During this period, TMU 2 monitors the line and transmits any received DTMF tones to CCU 3. As provided herein, that monitoring does not interfere with the detection of third party calls.

The detection of tones is well-known in the art. In U.S. Pat. No. 4,726,057 to Doerry et al., the detection of tones, such as SIT tones, is disclosed, and that patent is hereby incorporated by reference. In that patent, several drawings illustrate how tone detecting circuitry may be formulated.

While the invention has been described with reference to one or more preferred embodiments, such embodiments are merely exemplary and are not intended to be limiting or represent an exhaustive enumeration of all aspects of the invention. The scope of the invention, therefore, shall be defined solely by the following claims.

What is claimed is:

1. A method for detecting call bridging to a third party during a telephone conversation between a calling party and a called party, comprising:

detecting tones originated by the called party arising during the telephone conversation between the calling party and the called party;

comparing the tones to a predetermined call-bridging tone set to positively identify an attempt to bridge the telephone conversation between the calling party and the called party to include the third party; and executing call-bridging prevention instructions in response to an identified call-bridging attempt;

wherein the call-bridging tone set includes at least one of dial tones, busy signal tones, ring signal tones, dual tone multi-frequency ("DTMF") tones and special instruction tones ("SIT").

2. The method of claim 1 wherein executing the call-bridging prevention instructions comprises:

terminating the telephone conversation.

3. The method of claim 1 wherein executing the call-bridging prevention instructions comprises:

inserting a warning message into the telephone conversation.

4. The method of claim 1 wherein executing the call-bridging prevention instructions comprises:
   recording a telephone number of the third party.

5. The method of claim 1 wherein executing the call-bridging prevention instructions comprises:
   comparing a telephone number of the third party against a list of authorized called parties; and
   terminating the telephone conversation unless the telephone number of the third party appears on the list of authorized called parties.

6. A method for detecting call bridging to a third party during a telephone conversation between a calling party and a called party, comprising:
   detecting tones arising during the telephone conversation between the calling party and the called party;
   comparing the tones to a predetermined call-bridging tone set to identify an attempt to bridge the telephone conversation between the calling party and the called party to include the third party; and
   executing call-bridging prevention instructions in response to an identified call-bridging attempt,
   wherein executing the call-bridging prevention instructions comprises:
      terminating the telephone conversation unless an authorization code is received from the third party within a predetermined time period;
      wherein the call-bridging tone set includes at least one of dial tones, busy signal tones, ring signal tones, dual tone multi-frequency ("DTMF") tones and special instruction tones ("SIT").

7. A method for detecting call bridging to a third party during a telephone conversation between a calling party and a called party, comprising:
   detecting by an answer supervision board tone frequencies originated by the called party arising during the telephone conversation between the calling party and the called party that match a predetermined tone set to identify tone matches;
   determining by a computer control unit tone characteristics of tone matches received from the answer supervision board; and
   positively identifying by the computer control unit call-bridging attempts by comparing tone matches and tone characteristics received from the answer supervision board with a predetermined call-bridging tone data set; and
   executing call-bridging prevention instructions;
   wherein the predetermined call-bridging tone data set comprises at least one of dial tones, busy signal tones, ring signal tones, dual tone multi-frequency ("DTMF") tones and special instruction tones ("SIT").

8. The method of claim 7 wherein the call-bridging prevention instructions comprises:
   terminating the telephone conversation by the computer control unit after identifying a call-bridging attempt.

9. The method of claim 7 wherein the call-bridging prevention instructions comprises:
   introducing a warning message into the telephone conversation by the computer control unit after identifying a call-bridging attempt.

10. The method of claim 7 wherein the call-bridging prevention instructions comprises:
    recording a telephone number of the third party by the computer control unit after identifying a call-bridging attempt.

11. The method of claim 7 wherein the call-bridging prevention instructions comprises:
    terminating the telephone conversation by the computer control unit after identifying a call-bridging attempt unless a telephone number of the third party appears on a list of authorized called parties.

12. The method of claim 7 wherein the call-bridging prevention instructions comprises:
    terminating the telephone conversation by the computer control unit after identifying a call-bridging attempt unless an authorization code is received within a predetermined time period.

13. The method of claim 7 wherein executing the call-bridging prevention instructions comprises:
    storing at least one of a calling party calling history or a called party calling history by the computer control unit after identifying a call-bridging attempt.

14. A system for detecting call bridging to a third party during a telephone conversation between a calling party and a called party, comprising:
    tone detection means for monitoring the telephone conversation to detect bridging tones originated by the called party arising during the telephone conversation between the calling party and the called party to include a third party and sending bridging tone reports to a computer control unit; and
    the computer control unit configured to execute call-bridging prevention instructions upon receipt of a bridging tone report based on the comparison of the detected bridging tones to a predetermined call-bridging tone set;
    wherein the tone detection means are configured to detect bridging tones comprising at least one of dial tones, busy signal tones, ring signal tones, dual tone multi-frequency ("DTMF") tones and special instruction tones ("SIT").

15. The system of claim 14 wherein the computer control unit terminates the telephone conversation between the first party an d the second party in executing the call-bridging instructions.

16. The system of claim 14 wherein the computer control unit introduces a warning message into the telephone conversation in executing the call-bridging instructions.

17. The system of claim 14 wherein the computer control unit records a telephone number of the third party in executing the call-bridging instructions.

18. The system of claim 14 computer control unit in executing the call-bridging instructions disconnects the telephone conversation unless the telephone number of the third party appears on a list of authorized called parties.

19. A system for detecting call bridging to a third party during a telephone conversation between a calling party and a called party, comprising:
    a computer control unit configured to execute call-bridging prevention instructions upon receipt of a bridging tone report; and
    tone detection means for monitoring the telephone conversation to detect bridging tones arising during the telephone conversation between the calling party and the called party and sending bridging tone reports to a computer control unit;
    wherein the computer control unit in executing call-bridging prevention instructions terminates the telephone conversation unless an authorization code is received within a predetermined time period;
    wherein the tone detection means are configured to detect bridging tones comprising at least one of dial tones, busy signal tones, ring signal tones, dual tone multi-frequency ("DTMF") tones and special instruction tones ("SIT").

20. A system for detecting call bridging to a third party during a telephone conversation between a calling party and a called party, comprising:

an answer supervision board configured to detect tone frequencies originated by the called party arising during the telephone conversation between the calling party and the called party that match a predetermined tone set to determine tone matches; and a computer control unit configured to determine tone characteristics of tone matches received from the answer supervision board, to positively identify call-bridging attempts by comparing tone matches and tone characteristics with a predetermined call-bridging tone data set, and to execute call bridging prevention instructions after identifying a call bridging attempt, wherein the answer supervision board is configured to detect tone frequencies comprising at least one of dial tones, busy signal tones, ring signal tones, dual tone multi-frequency ("DTMF") tones, and special instruction tones ("SIT").

21. The system of claim 20 wherein the computer control unit is further configured to terminate the telephone conversation between the calling party and the called party after identifying a call-bridging attempt.

22. The system of claim 20 wherein the computer control unit is further configured to introduce a warning message into the telephone conversation after identifying a call-bridging attempt.

23. The system of claim 20 wherein the computer control unit is further configured to record a telephone number of the third party after identifying a call-bridging attempt.

24. The system of claim 20 wherein after identifying a call-bridging attempt the computer control unit is further configured to compare a telephone number of the third party against a list of authorized called parties and disconnect the telephone conversation unless the telephone number of the third party appears on the list of authorized called parties.

25. The system of claim 20 wherein after identifying a call-bridging attempt the computer control unit is further configured to terminate the telephone conversation unless an authorization code is received within a predetermined time period.

26. The system of claim 20 wherein the computer control unit is further configured to process at least one of a first party calling history or a second party calling history.

27. The system of claim 20, further comprising:

a trunk management unit configured to provide telephony services between the calling party and the called party and further configured to contain the answer supervision board.

* * * * *

UNITED STATES PATENT AND TRADEMARK OFFICE
CERTIFICATE OF CORRECTION

PATENT NO. : 6,611,583 B1
DATED : August 26, 2003
INVENTOR(S) : Jay L. Gainsboro It is certified that error appears in the above-identified patent and that said Letters Patent is hereby corrected as shown below:

<u>Column 18,</u>
Lines 38 and 39, should read as follows:
-- terminates the telephone conversation between the calling party and the called
party in executing the call-bridging --
Line 47, should read as follows:
-- 18. The system of claim 14 wherein the computer control unit in --

<u>Column 20,</u>
Lines 19 and 20, should read as follows:
-- unit is further configured to process at least one of a calling party calling history or
a called party calling history. --

Signed and Sealed this

Twenty-seventh Day of January, 2004

JON W. DUDAS
*Acting Director of the United States Patent and Trademark Office*